United States Patent
Thomas et al.

(10) Patent No.: US 11,456,475 B2
(45) Date of Patent: Sep. 27, 2022

(54) METHOD FOR MANUFACTURING A MEMBRANE ASSEMBLY FOR A FUEL CELL WITH CATALYST-FREE EDGE TO THE FRAME; MEMBRANE ASSEMBLY AND FUEL CELL WITH MEMBRANE ASSEMBLY

(71) Applicants: cellcentric GmbH & Co. KG, Kircheim unter Teck (DE); Ford Motor Company, Dearborn, MI (US)

(72) Inventors: Owen Thomas, Vancouver (CA); Keping Wang, New Westminster (CA); Carmen Chuy, Burnaby (CA); Yunsong Yang, Surrey (CA)

(73) Assignees: cellcentric GmbH & Co. KG, Kircheim unter Teck (DE); Ford Motor Company, Dearborn, MI (US)

( * ) Notice: Subject to any disclaimer, the term of this patent is extended or adjusted under 35 U.S.C. 154(b) by 23 days.

(21) Appl. No.: 16/812,630

(22) Filed: Mar. 9, 2020

(65) Prior Publication Data
US 2021/0280884 A1 Sep. 9, 2021

(51) Int. Cl.
*H01M 8/1004* (2016.01)
*H01M 4/86* (2006.01)
*H01M 4/88* (2006.01)

(52) U.S. Cl.
CPC ....... *H01M 8/1004* (2013.01); *H01M 4/8657* (2013.01); *H01M 4/8814* (2013.01); *H01M 4/8896* (2013.01)

(58) Field of Classification Search
CPC ............. H01M 4/8657; H01M 4/8814; H01M 4/8896; H01M 8/1004
See application file for complete search history.

(56) References Cited

U.S. PATENT DOCUMENTS

2005/0271929 A1* 12/2005 Sompalli ............. H01M 4/8817
429/465
2014/0329162 A1 11/2014 Kim et al.

FOREIGN PATENT DOCUMENTS

EP 1876666 B1 11/2012

OTHER PUBLICATIONS

International Search Report and Written Opinion dated Jun. 21, 2021, in International Application No. PCT/EP2021/055546.

* cited by examiner

*Primary Examiner* — Brittany L Raymond
(74) *Attorney, Agent, or Firm* — Patent Central LLC; Stephan A. Pendorf

(57) ABSTRACT

A method for manufacturing a membrane assembly for a fuel cell, which membrane assembly includes a membrane with a catalyst layer and a frame arranged on the same side of the membrane and a gap between the catalyst layer and the frame. To allow an easy and cost-effective way for manufacturing such a membrane assembly, the manufacturing method may include the following steps:
  positioning a first decal layer, which is made of the same material as the first catalyst layer, on the first side of the membrane in a way that the first decal layer overlaps the frame,
  positioning a second decal layer, which is made of the same material as the second catalyst layer, on the second side of the membrane,
  pressing the first decal layer and the second decal layer against each other with the membrane and the frame positioned in-between.

6 Claims, 3 Drawing Sheets

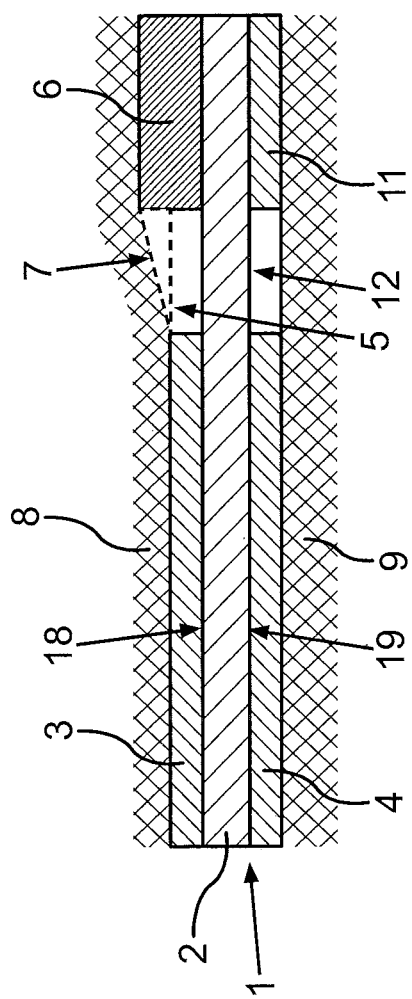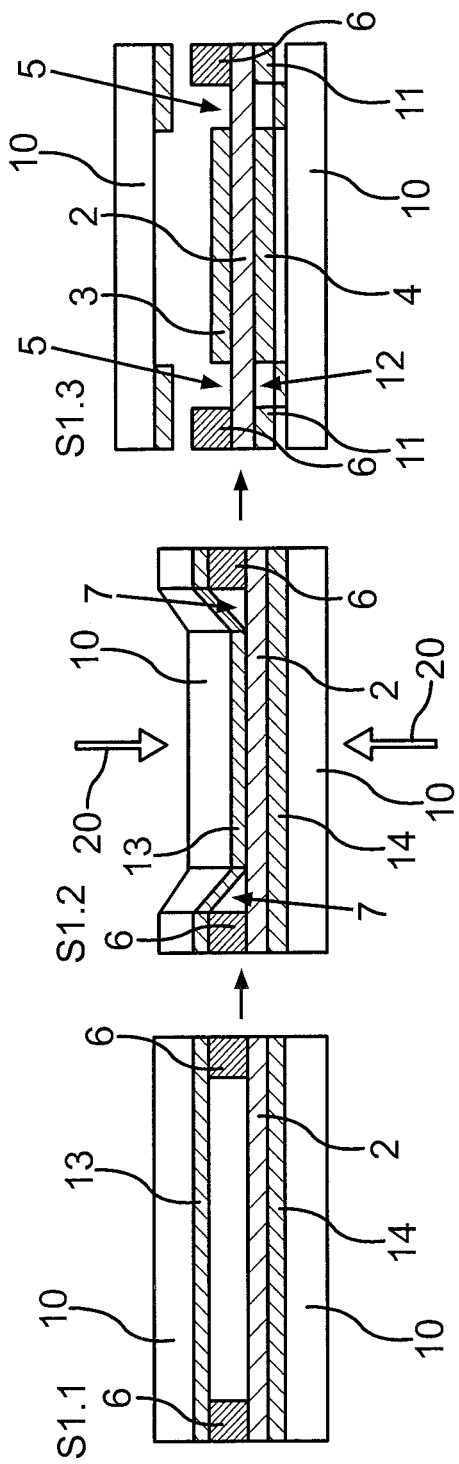

Figure 3:
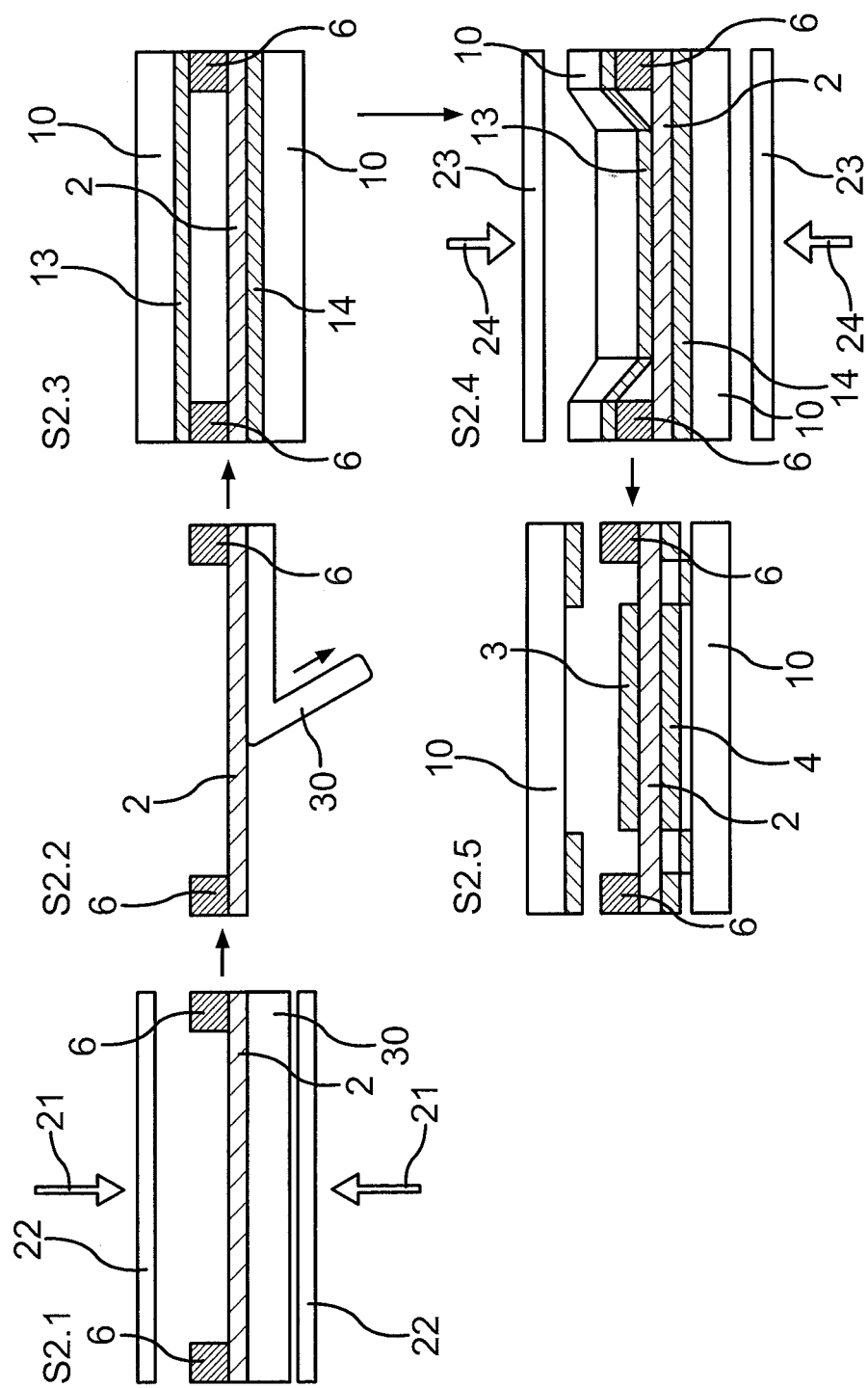

METHOD FOR MANUFACTURING A MEMBRANE ASSEMBLY FOR A FUEL CELL WITH CATALYST-FREE EDGE TO THE FRAME; MEMBRANE ASSEMBLY AND FUEL CELL WITH MEMBRANE ASSEMBLY

The present invention relates to a method for manufacturing a membrane assembly for a fuel cell, which membrane assembly comprises a membrane with a first side and a second side, a first catalyst layer arranged on the first side of the membrane and a second catalyst layer arranged on the second side of the membrane, a frame arranged at least on the first side of the membrane, wherein the frame encircles the first catalyst layer in a plane of the main extension direction of the first catalyst layer, and a gap between the first catalyst layer and the frame. Another aspect of the present invention relates to a membrane assembly for a fuel cell which is manufactured by the above-mentioned method. A further aspect of the invention relates to a fuel cell with said membrane assembly.

Membrane assemblies, also often referred to as membrane electrode assembly (MEA), are well-known for usage in a fuel cell. If such a membrane assembly comprises a frame, it is also referred to a membrane electrode frame assembly (MEFA). A fuel cell is configured to convert a fuel, for example, hydrogen, into electrical energy, in particular an electrical voltage resulting in an electrical current, when a power circuit is closed.

The membrane assembly for the fuel cell comprises the membrane, also referred to as electrolyte, and the first and second catalyst layer, which also can be referred to as electrodes. A multitude of fuel cells can be combined to a stack of fuel cells. Each of the fuel cells of the stack can comprise a respective membrane assembly.

Current membrane assemblies, membrane electrode frame assemblies in particular, are proned to failures at an edge between the frame and the catalyst layers. Such failures can be caused by chemical degradation in the region where the catalyst layer and the frame face each other. In this region, where the frame and the catalyst layer face, can be a gas diffusion layer, which goes over the frame. Such a gas diffusion layer may be arranged on both surfaces of the membrane assembly. The chemical degradation can be caused by a so-called "local OCV (Open Circuit Voltage)" type condition in this region. The OCV-type degradation occurs when hydrogen peroxide and associated radicals are formed either by hydron diffusion through the membrane and reacting with oxygen at the cathode or oxygen diffusing through the membrane and reacting with hydrogen at the anode.

Document EP 1 876 666 B1 reveals a polymer electrolyte fuel cell comprising a stack of one or more cells each having a MEA and anode and cathode separators that sandwich that MEA therebetween. Electrode layers of said fuel cell have a peripheral region.

The present invention is directed to overcoming the above-mentioned problem of the chemical degradation.

This object is solved by the membrane assembly, the method for manufacturing the membrane assembly and the fuel cell of the independent claims. Advantageous embodiments and practical improvements are subject-matter of the dependent claims.

The invention is based on the idea that the degradation, which is mentioned above, is turned off when there are no catalyst layers are present in the region of the frame. In other words, it is part of the idea to form the membrane assembly in a way that the first catalyst layer and the frame are fully divided by the gap between them. In other words, the gap is supposed to separate the frame from the first catalyst layer. The gap may have a at least substantially constant width. Again, in other words, the width may be the distance by which the frame and the catalyst layer, especially the first catalyst layer, and the frame are separated from each other.

The present method is suitable for manufacturing a membrane assembly for a fuel cell, which membrane assembly comprises a membrane with a first side and a second side, a first catalyst layer arranged on the first side of the membrane and a second catalyst layer arranged on the second side of the membrane, a frame arranged at least on the first side of the membrane, wherein the frame encircles the first catalyst layer in a plane of the main extension direction of the first catalyst layer and a gap between the first catalyst layer and the frame.

To allow an easy and cost-effective way for manufacturing such a membrane assembly, it is envisaged that the manufacturing method comprises the following steps:

Positioning a first decal layer, which is made of the same material as the first catalyst layer, on the first side of the membrane relative to the frame, which is positioned on the first side of the membrane, in a way that the first decal layer overlaps the frame, positioning a second decal layer, which is made of the same material as the second catalyst layer, on the second side of the membrane, and pressing the first decal layer and the second decal layer against each other with the membrane and the frame positioned in-between.

The frame may form a closed loop around the first catalyst layer when both are arranged on the first side of the membrane. In some embodiments it may be envisaged that the frame is arranged on both the first side and the second side of the membrane. In these embodiments, the frame may comprise two parts, which are arranged on a different side of the membrane each. In this case, the first side of the membrane may be encircled by a first part of the frame and the second catalyst layer may be encircled by a second part of the frame. Within the scope of the present invention "encircled" means in particular fully encircled. In other words, the first side of the membrane can be fully surrounded or enclosed by the frame in the plane of the main extension direction of the first catalyst layer. Between the first catalyst layer and the frame is a spare region, which forms the gap. In other words, in the gap neither a part of the frame nor a part of the first catalyst layer is arranged on the membrane. As mentioned above, the gap may have a constant valve between the first catalyst layer and the frame.

The first catalyst layer is made from the first decal layer in a decal transfer process. The second catalyst layer is made from the second decal layer in a decal transfer process. This decal layer process may comprise the above-mentioned steps of positioning the first decal layer and the second decal layer as well as pressing the first and the second decal layer against each other. The inventive manufacturing method utilizes the fact that the thickness of the membrane and the frame positioned in-between the first and the second decal layer while pressing them against each other is not constant. The combination of membrane and frame has a greater thickness of regions of the membrane where parts of the frame are arranged on the membrane. In other words, the membrane and the frame have a greater thickness in regions where the frame extends. Analogously, in regions where the frame does not extend the thickness equals the thickness of the membrane. In regions, where the frame extends the thickness equals the thickness of the membrane plus the thickness of the frame. Therefore, in regions where the frame is arranged on the membrane, automatically a higher pressure is applied compared to regions of the membrane not covered by the frame. This is even then ensured, when a press with two respective press surfaces to press the first and the second decal layer against each other is plain. With increasing distance from the frame, the pressure applied while pressing increases. In other words, the lowest pressure is applied where the gap is supposed to be located. As a result of this, the first decal layer does not adhere to the first side of the membrane next to the frame. On a first side of the gap, where the frame is located, the first decal layer does equally not adhere, when the frame is made of an appropriate material. In other words, the frame can be made from a material where the first decal layer does not adhere to. On a second side of the gap, where the first catalyst layer is supposed to be formed, the pressure is sufficient to make the first decal layer adhere to the membrane. Therefore, the adhering part of the decal layer forms the first catalyst layer.

Before the pressing of the first decal layer and the second decal layer against each other, both decal layers are positioned. It can be envisaged that the first decal layer overlaps the frame. Advantageously, the first decal layer has greater dimensions than the region of the membrane which is covered by the frame, the gap and the first catalyst layer together. Said region can be fully overlapped by the first decal layer. The second decal layer may have the same size, at least substantially, like the first decal layer. The second decal layer may be positioned analogously to the first decal layer but on the second side of the membrane. For example, the second decal layer may be positioned in a way that its projection into the plane of the membrane equals the projection of the first decal layer into the plane.

In the next step, both decal layers are pressed against each other. This happens while the membrane with the frame positioned on the first side of the membrane is positioned in-between the first and the second decal layer. While positioning the first and the second decal layer and/or while pressing them against each other, the decal layers may be arranged on a respective substrate. The substrate can fa facilitate the handing of the decal layers and stabilize them while pressing and/or positioning. The pressing can be done by a hot press. For example, the pressing is carried out by pressing two pressing surfaces with the first and the second decal layer as well as the membrane and the frame in-between against each other. Due to the pressing, both decal layers adhere partly to the first or second side of the membrane. The part of the decal layer which adheres to the first side of the membrane can form the first catalyst layer. The part of the second decal layer which adheres to the second side of the membrane can form at least essentially the second catalyst layer.

Sometimes, another part of the second decal layer may adhere to the membrane on its second side opposite to the regions where the membrane touches the frame on the first side. This can be referred to as additional catalyst layer. The additional catalyst layer does not affect the usage properties of the membrane assembly or a fuel cell constructed with the membrane assembly. An additional gap may be formed on the second side of the membrane just in the opposite position of the gap on the first side of the membrane. This is due to the fact that the first and the second catalyst layer may have the same extension over the respective side of the membrane.

The present manufacturing method provides an easy way to produce a membrane assembly with a frame and a catalyst layer and with a gap between the frame and the catalyst layer. The first and the second decal layer can have a much greater extension than the resulting membrane assembly. It is no careful alignment of the first catalyst layer and the frame relative to each other necessary for providing the gap. Also no careful alignment of the first catalyst layer and the second catalyst layer relative to each other is necessary. In opposite, the gap is formed automatically during the manufacturing method without precise or accurate positioning of the frame and the first catalyst layer relative to each other.

According to a further development of the invention, it is envisaged that the positioning of the second decal layer is carried out in a way that the decal layer overlaps the projection of the frame into a plane of the second decal layer. In other words, the second decal layer can overlap the frame or its projection into the plane of the second decal layer. Advantageously, the overlapping is the same like the overlapping of the first decal layer with respect to the frame. In particular, the second decal layer may overlap the frame or its projection respectively in every direction. In particular, the second decal layer may overlap the projection of the frame, the gap and the first catalyst layer into the plane of the second decal layer. By that it is ensured that the first and second catalyst layer are arranged on the membrane on a different side each but direct opposite to each other. In other words, the projection of the first and second catalyst layer into the plane of the membrane can be at least substantially equal.

According to a further development, the pressing is carried out with two pressing surfaces both overlapping the frame. In other words, the two pressing surfaces can overlap the frame, the gap and the first or the second catalyst layer, respectively. By that it is ensured that an appropriate pressure is applied to form the gap, the first and the second catalyst layer.

According to a further development, it is envisaged that prior to the positioning of the first catalyst layer and the second decal layer the frame is arranged on the membrane by a separate pressing procedure. The separate pressing procedure can be carried out with the same press and/or the same two pressing surfaces like the pressing of the first and the second decal layer against each other. In particular, the separate pressing procedure can be a hot pressing with a hot press. The advantage of the separate pressing procedure is that the frame is already fixed to the membrane when the positioning of the first and the second decal layer is carried out.

According to another development, it is envisaged that prior to the positioning of the first decal layer and the second decal layer the frame is positioned on the membrane to be fixed to the membrane in the following of pressing the first decal layer and the second decal layer against each other. In other words, only one pressing procedure is envisaged for both fixing the frame to the membrane and forming the first and the second catalyst layer from the respective decal layers. This can result in a more cost-effective production of the membrane assembly.

According to a further development, it is envisaged that a thickness of the frame is varied for adjusting the width of the gap. For example, frames of different thickness can be used as they result in a different width of the gap. Other factors, which can be used for adjusting the width of the gap are a compliance of the press or calendar materials. All these parameters can be tuned to ensure the gap is catalyst-free in an easy way.

Another aspect of the invention relates to the membrane assembly for a fuel cell, comprising:
 A membrane with a first side and a second side,
 a first catalyst layer arranged on the first side of the membrane and a second catalyst layer arranged on the second side of the membrane, a frame arranged on least to the first side of the membrane, wherein the frame encircles the first catalyst layer in the plane of the main extension direction of the catalyst layer, and a gap between the first catalyst layer and the frame.

To allow an easy and cost-effective way for manufacturing such a membrane assembly, the membrane assembly is characterized in that the first catalyst layer is formed from a first decal layer made of the same material as the first catalyst layer by decal transfer and the second catalyst layer is formed from a second decal layer made of the same material as the second catalyst layer by decal transfer, and the gap between the first catalyst layer and the frame is formed by the decal transfer by pressing the first decal layer overlapping the frame and the second decal layer against each other with the membrane and the frame in-between.

The membrane assembly is distinguishable from any other membrane assembly due to the different properties of the first and the second catalyst layer as a result of the formation from the respective decal layer. The forming of the gap by means of the pressing also results in differing properties of the gap compared to other membrane assemblies. Especially, the edges of the first catalyst layer facing the gap can be different as well as the width of the gap which is unusual constant.

The resulting membrane assembly has already been discussed within the scope of the manufacturing method. The first catalyst layer and the second catalyst layer can be made of the same material. In this case, the first and the second decal layer can also be made from the same material. The first and the second catalyst layer can be configured to enhance the transformation of the fuel into the electrical energy. The first and/or the second catalyst layer can be made of an electrically conductive material. Therefore, they can be referred to as electrodes as well. The electrodes or the catalyst layers can be configured to conduct the electrical energy or the electrical current to poles of the membrane assembly or a fuel cell respectively, when the membrane assembly is part of the fuel cell.

According to a further development, it is envisaged that the first catalyst layer and the second catalyst are (at least substantially) fully overlapping with respect to their extension parallel to the membrane. In other words, the first and the second decal layer may have the (at least substantially) same projection into the plane of the membrane. For example the first and the second decal layer may have the (at least substantially) same size, extension and position parallel to the membrane. A precise equivalent positioning of both catalyst layers on both sides of the membrane is ensured by that and may crucial for a advantageous functioning of the membrane assembly or a fuel cell of which the membrane assembly is part of.

A third aspect of the invention relates to a fuel cell with the above-mentioned membrane assembly. In other words, the fuel cell may comprise the above-mentioned membrane assembly. Again in other words, the fuel cell may comprise a membrane assembly which is manufactured with the above-mentioned manufacturing method.

The fuel cell can comprise one or more such membrane assemblies. The fuel cell can be stacked with other fuel cells to a fuel cell stack. The fuel cells of the fuel cell stack may be connected with without mechanically as well as electrically. The fuel from conversion into the electrical energy may flow through all fuel cells of the fuel cell stack. Also exhaust gases resulting of said conversion can be exhausted by the same exhaust. The fuel cells of the fuel cell stack can be electrically connected in parallel or in series or in a combination of both.

The fuel cell may further comprise a housing which at least partly surrounds the membrane assembly. The fuel cell may comprise one or more gas diffusion layers for allowing the fusion of the fuel. A first gas diffusion layer can, for example, be arranged on the first catalyst layer. The first gas diffusion layer can also extend over the gap and/or the frame. In other words, the first gas diffusion layer may cover the first catalyst layer, the gap and the frame. A second gas diffusion layer can be arranged on the second catalyst layer. The second gas diffusion layer may extend over the whole second side of the membrane. Therefore, it may extend over the additional gap on the second side of the membrane and/or the additional catalyst layer.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

Figure 4:
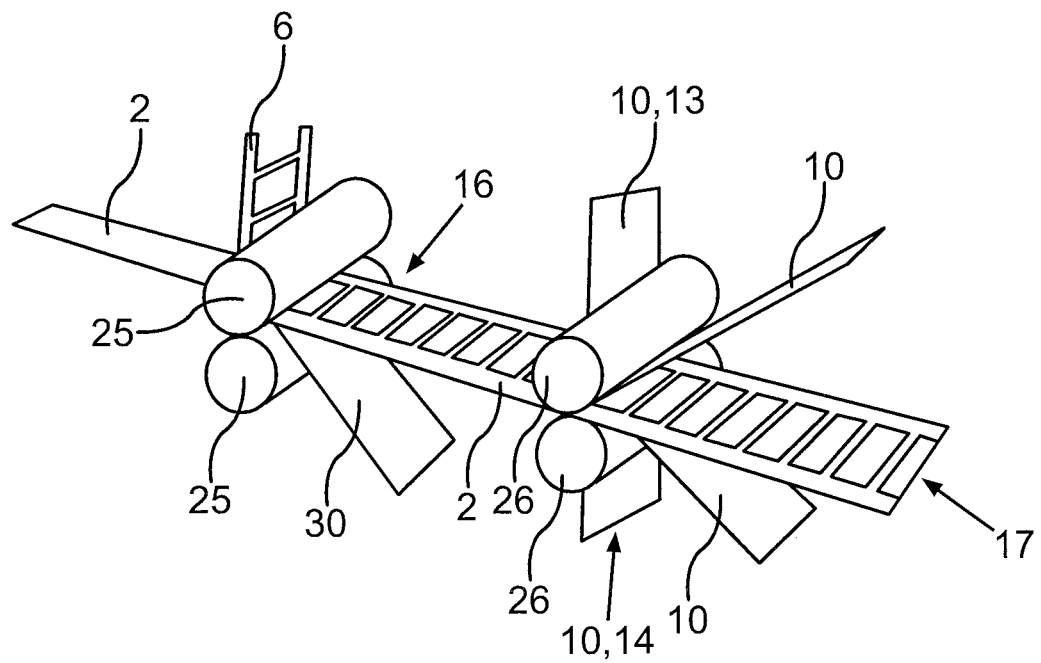
Figure 5:
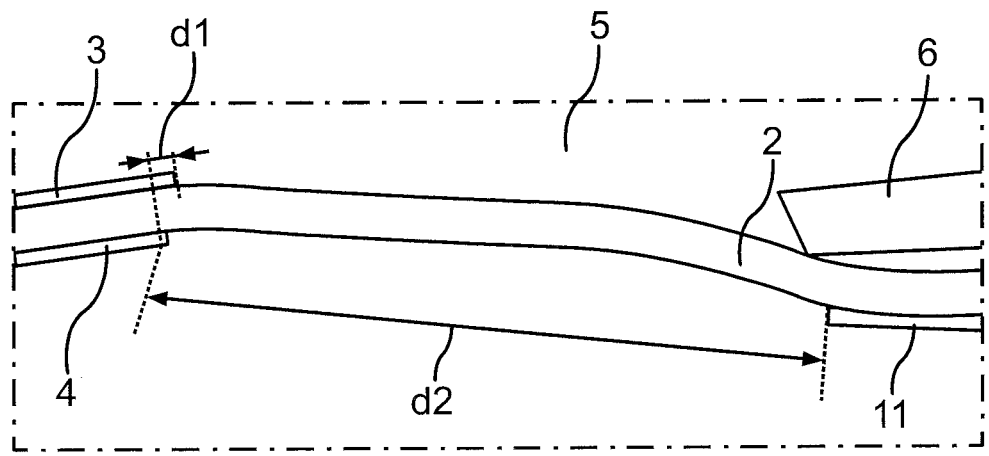

The drawings show in:

FIG. 1 a schematic cross-section of an excerpt of a membrane assembly with additional gas diffusion layers;

FIG. 2 exemplary steps for manufacturing the membrane assembly with one pressing procedure;

FIG. 3 a method for manufacturing the membrane assembly with two separate pressing procedures;

FIG. 4 a technical apparatus for performing the manufacturing method with two pressing steps; and FIG. 5 a schematic representation of a prototype of the membrane assembly in a cross section.

In the figures the same elements or elements having the same function are indicated by the same reference signs.

FIG. 1 shows a membrane assembly 1 comprising a membrane 2, a frame 6 arranged on the membrane 2 and catalyst layers 3, 4 on both sides of the membrane too. On both sides the membrane assembly 1 is coated is with a gas diffusion layer 8, 9. The respective gas diffusion layers 8, 9 can be either considered a part of the membrane assembly 1 or not part of the membrane assembly 1.

The membrane 2, which can also referred to as electrolyte, has a first side 18 and a second side 19. The membrane 2 can permeable or semi-permeable to enable an exchange of ions and/or molecules between the first side 18 and the second side 19. A first catalyst layer 3 is arranged on the first side 18 of the membrane 2. A second catalyst layer 4 is arranged on the second side 19 of the membrane 2. The frame 6 is arranged on the first side 18 of the membrane 2. The first catalyst layer 3 and the second catalyst layer 4 can be formed as electrodes. In other words, the catalyst layers 3, 4 can be configured to conduct an electrical current. The catalyst layers 3, 4 can be made of different or the same material. Both catalyst layers 3, 4 can be configured to catalyze a conversion from a fuel into electrical energy. For example, fuel and ambient air or oxygen can be converted to energy and exhaust gases by the catalyst layers 3, 4. When arranged in a fuel cell, the membrane assembly 1 can be arranged to carry out the conversion. The fuel cell can comprise one or more membrane assemblies 1 and a housing (not shown in the figures).

Catalytic reactions in and around the first catalyst layer 3 can lead to degradation processes at the frame 6. This may happen especially when the first catalyst layer 3 and the frame 6 face each other directly. In other words, the degradation especially occurs where the first catalyst layer 3 and the frame 6 touch each other or are at least very close to each other. The degradation can be a chemical degradation which is caused by a local open circuit voltage type condition in this area. The open circuit voltage type degradation occurs when hydrogen peroxide and associated radicals are formed by either hydrogen diffusing the membrane 2 and reacting with oxygen at the cathode or oxygen diffusing through the membrane 2 and reacting with hydrogen at the anode. This degradation pathway is turned off when there is no catalyst layer 3, 4 present in this area. Hence, there is a gap 5 between the frame 6 and the first catalyst layer 3. In other embodiments not shown in the figures, the frame 6 may be arranged on both sides 18, 19 of the membrane 2. For example, the frame 6 may consist of at least two parts, where a first part is arranged on the first side 18 and a second part is arranged on the second side 19. It is also possible that the frame 6 unfolds a match of the membrane 2 and therefore touches both sides 18, 19 of the membrane 2. If this is the case, the above-mentioned is also valid for the second catalyst layer 4 and the frame 6. Anyway, there is an additional gap 12 between the second catalyst layer 4 and a projection of the frame 6 into a plane of the second catalyst layer 4. In the present case, there is an additional catalyst layer 11 in the area of the projection of the frame 6 into the plane of the second catalyst layer 4.

A first gas diffusion layer 8 covers the first catalyst layer 3, the gap 5 and the frame 6. The region of a thought triangle above the gap 5 is also referred to as triangle region 7. In other words, all arrangements on the first side 18 are fully covered with the gas diffusion layer 8. In case there would be no gap 5, the triangle region would be located between the first catalyst layer 3, the first gas diffusion layer 8 and the frame 6. A second gas diffusion layer 9 is arranged on the second catalyst layer 4 and the additional catalyst layer 11. The second catalyst layer 9 also covers the additional gap 12. Analogously, the gap 5 is covered by the first gas diffusion layer 8.

Now referring to FIG. 2, a first possibility for manufacturing the membrane assembly 1 is shown. In a first step S1.1 of the exemplary method, the membrane 2, the frame 6, a first decal layer 13 and a second decal layer 14 are positioned relative to each other. More precisely, the second decal layer 14 is positioned on the second side 19 of the membrane 2. The frame 6 is positioned on the first side 18 of the membrane 2. The first decal layer 13 is also positioned on the first side 18 of the membrane 2. The position of the first decal layer 13 is carried out in a way that it overlaps the frame 6. In other words, the frame 6 is positioned between the membrane 2 and the first decal layer 13. Hence, the frame 6 touches the first side 18 of the membrane 2 with its first side and the frame 6 touches the first decal layer 13 with its second side. The first side and the second side of the frame 6 can be at least substantially parallel to each other. Both decal layers 13, 14 are arranged on a respective backer 10. The backer 10 or substrate makes a handling of the respective decals 13, 14 easier. In other words, the backer 10 facilitates the handling of the decal layers 13, 14. In a following step S1.2, the whole arrangement of decal layers 13, 14, membrane 2 and frame 6 is pressed in a pressing procedure 20. By the pressing procedure 20 the frame 6 gets firmly connected to the membrane 2. Also parts of the decal layers 13, 14 are getting firmly connected to the membrane 2. In particular, the first decal layer 13 gets partly attached to the first side 18 of the membrane 2. The part of the first decal layer 13 which gets attached to the membrane 2 forms the first catalyst layer 3. In particular, the second decal layer 14 gets partly attached to the second side 19 of the membrane 2. The part of the second decal layer 14 which gets attached to the membrane 2 forms the second catalyst layer 4. This can be seen in step 1.3. Therefore, the first decal layer 13 is made of the same material as the first catalyst layer 3. Analogously, the second decal layer 14 is made of the same material as the second catalyst layer 4. If both catalyst layers 3, 4 consist of the same material, both decal layers 13, 14 may be equal.

In the step S1.2 due to the presence of the frame 6 in the triangle region 7, less pressure is applied compared to the region where the respective catalyst layers 3, 4 are formed. Of course, a relatively high pressure is also applied where the frame 6 is. Because there the first decal layer 13 does not connect properly to the frame 6, the decal layer remains on the backer 10, where the frame 6 and the first decal layer 13 face without. On the second side 19 of the membrane 2 the decal layer also gets attached to the membrane 2 opposite the frame 6. This leads to the formation of the additional catalyst layer 11. This additional catalyst layer 11 is not necessary for the function but does not any harm to the fuel cell or the membrane assembly 1. Due to the lower pressure during the pressing procedure 20, neither the first decal layer 13 nor the second decal layer 14 are getting attached to the membrane 2 in the area of the gap 5 and the additional gap 12. This is the desired effect of the present manufacturing method.

In another possible manufacturing method two pressing procedures 21, 24 are envisaged in opposite to the single pressing procedure 20. A step by step diagram is shown in FIG. 3. In a first step S2.1, the frame 6 gets positioned on the membrane 2 and pressed in a first separate pressing procedure 21. During the first separate pressing procedure 21, the frame 6 gets attached to the first side 18 of the membrane 2. During the first pressing procedure 21, the membrane 2 can be attached to a backer 30 or substrate. Analogously to the backer 10 of the decal layers 13, 14, the backer 30 can facilitate the handling of the membrane 2. After the first pressing procedure 21, the backer 30 gets removed from the membrane 2. This can happen in a step S2.2. In a following step S2.3, both decal layers 13, 14 are positioned on the membrane 2. This step can be understood analogously to step S1.1, as the decal layers 13, 14 have to be positioned relative to the membrane 2 and the frame 6 the same way. In particular, the first decal layer 13 is positioned on the first side 18 of the membrane 2 in a way that the first decal layer 13 overlaps the frame 6. In particular, the second decal layer 14 is positioned on the second side 19 of the membrane 2. Advantageously, the second decal layer 14 is positioned in a way that the decal layer 14 overlaps the projection of the frame 6 into a plane of the second decal layer 14.

In a step S2.4, a second pressing procedure 24 is carried out. By that pressing procedure 24, the first catalyst layer 3 and the second catalyst layer 4 are formed. In a step S2.5, the pressure is removed and the backers 10 are removed. The result is literally the same as described above according to the steps S1.2 and S1.3. Pressing surfaces 22 and 23 used for the respective pressing procedures 21 and 24 can be the same or different. The pressing surfaces 22 and/or 23 may be part of a hot press or a respective hot press. Hence, the pressing procedures 21 and 24 can be hot pressing procedures. Analogously, the pressing procedure 20 can be a hot pressing procedure.

FIG. 4 shows an example for an apparatus to perform the manufacturing method according to FIG. 3. The pressing surfaces 22 can be provided by rollers 25, each. Analogously, the pressing surfaces 23 can be provided by respective rollers 26. The apparatus should briefly be described in the following:

The membrane 2 and its backer 30 and together with the frame 6 get into the rollers 25. The rollers 25 are performing the first pressing procedure 21. Due to the continuous process in which the membrane 2 moves to the right according to FIG. 1, the rollers 25 provide a singular effect like the plane pressing surfaces 22. After the first pressing procedures 21 in-between the two rollers 25, the backer 30 is removed from the membrane 2. The result is a framed membrane 16 as an intermediate product. For the second pressing procedure 24 realized by the rollers 26, both decal layers 13, 14 are provided on their respective backer on the respective side of the membrane or the framed membrane 16, respectively. So just before the rollers 26, the step S2.3 is carried out. In-between the rollers 26, the step S2.4 or the second pressing procedure 24 is carried out. When leaving the rollers 26, both backers 10 are removed. That equals the step S2.5. The result is the endless role of membrane assemblies 17.

Finally, FIG. 5 shows a cross section of an excerpt of the membrane assembly 1. FIG. 5 is a drawing of a prototype manufactured with the present manufacturing method according to FIG. 2 or FIG. 3. In FIG. 5 can be seen that both catalyst layers 3 and 4 are aligned to each other very well. The difference of size and/or alignment d1 was approximately 10 μm. In other words, bot catalyst layers 3, 4 are positioned opposite to each other within the neglectable tolerance of 10 μm. A width d2 of the gap 5 equals 500 μm in the prototypes. It should be mentioned that the give measures for d1 and the width d2 are only exemplary. Nevertheless, both measures have proven to be useful in practical examples.

REFERENCE SIGNS 1 membrane assembly
2 membrane
3 first catalyst layer
4 second catalyst layer
5 gap
6 frame
7 triangle region
8 first diffusion layer
9 second diffusion layer
10 backer
11 additional catalyst layer
12 additional gap
13 first decal layer
14 second decal layer
16 framed membrane
17 membrane assemblies
18 first side
19 second side
20 pressing procedure
21 pressing procedure
22 pressing surfaces
23 pressing surfaces
24 pressing procedure
25 rollers
26 rollers
30 backer
S1.1 . . . S1.3 steps
S2.1 . . . S2.5 steps

The invention claimed is:

1. A method for manufacturing a membrane assembly for a fuel cell, which membrane assembly comprises
   a membrane with a first side and a second side,
   a first catalyst layer arranged on the first side of the membrane and a second catalyst layer arranged on the second side of the membrane,
   a frame arranged at least on the first side of the membrane, wherein the frame encircles the first catalyst layer in a plane of the main extension direction of the first catalyst layer, and
   a gap between the first catalyst layer and the frame, the method comprising the following steps:
   positioning a first decal layer, which is made of the same material as the first catalyst layer, on the first side of the membrane relative to the frame, which is positioned on the first side of the membrane, in a way that the first decal layer overlaps the frame,
   positioning a second decal layer, which is made of the same material as the second catalyst layer, on the second side of the membrane,
   pressing the first decal layer and the second decal layer towards each other with the membrane and the frame positioned in-between, wherein with increasing distance from the frame, the pressure applied while pressing increases, resulting in the first decal layer not adhering to the first side of the membrane next to the frame.

2. The method according to claim 1, wherein the positioning of the second decal layer is carried out in a way that the second decal layer overlaps a projection of the frame into a plane of the second decal layer.

3. The method according to claim 1, wherein the pressing is carried out with two pressing surfaces both overlapping the frame.

4. The method according claim 1, wherein prior to the positioning of the first decal layer and the second decal layer the frame is arranged on the membrane by a separate pressing procedure.

5. The method according to claim 1, wherein prior to the positioning of the first decal layer and the second decal layer the frame is positioned on the membrane to be fixed to the membrane in the following step of pressing the first decal layer and the second decal layer against each other.

6. The method according to claim 1, wherein a thickness of the frame is varied for adjusting the width of the gap.

* * * * *